UNITED STATES PATENT OFFICE.

EDWIN O. BARSTOW, OF MIDLAND, MICHIGAN, ASSIGNOR TO THE DOW CHEMICAL COMPANY, OF MIDLAND, MICHIGAN, A CORPORATION OF MICHIGAN.

PROCESS FOR MAKING SODIUM SULFITE.

1,343,897.  Specification of Letters Patent.  Patented June 22, 1920.

No Drawing.  Application filed June 25, 1918. Serial No. 241,862.

*To all whom it may concern:*

Be it known that I, EDWIN O. BARSTOW, a citizen of the United States, and a resident of Midland, county of Midland, and State of Michigan, have invented a new and useful Improvement in Processes for Making Sodium Sulfite, of which the following is a specification, the principle of the invention being herein explained and the best mode in which I have contemplated applying that principle, so as to distinguish it from other inventions.

So far as I am aware, sodium sulfite ($Na_2SO_3$) has heretofore been made commercially only by reacting on sodium carbonate with sulfur dioxid in solution, or else from the bisulfite, or hydrogen sulfite ($NaHSO_3$), which is prepared by a similar reaction. Where the sulfite is thus to be prepared directly, a given quantity of sodium carbonate solution is divided into two equal parts, one part is then saturated with the sulfur dioxid, and the resulting bisulfite converted to neutral sulfite by mixing it with the other part. The object of the present invention is to utilize other and different materials in the production of such sodium sulfite, and particularly to use calcium sulfite ($CaSO_3$) which is a waste product from the manufacture of certain spray compounds, as also from the manufacture of magnesium chlorid by certain processes.

To the accomplishment of the foregoing and related ends, the invention, then, consists of the steps hereinafter fully described and particularly pointed out in the claims, the following description setting forth in detail one approved mode of carrying out the invention, such disclosed mode, however, constituting but one of the various ways in which the principle of the invention may be used.

As indicated above, I utilize as one of the materials in my new process for manufacturing sodium sulfite, calcium sulfite, which is relatively inexpensively obtained; in fact constitutes, in certain known manufacturing processes, a by-product, for which it is an object to find a further use. I have found that sodium acid sulfate ($NaHSO_4$), or ordinary niter cake, will react with such calcium sulfite to form sodium acid sulfite ($NaHSO_3$). This may then in turn be readily converted into the normal sulfite by adding milk of lime or calcium hydroxid.

In carrying out my improved process accordingly, I make a mixture of calcium sulfite and water, and add thereto a solution of niter cake, or sodium acid sulfate, in chemically equivalent amount, whereupon a precipitate of calcium sulfate in a solution of sodium acid sulfite results. The reaction that occurs may be represented by the following formula:

The separation of the precipitate of calcium sulfate from the solution by any well known means will leave the acid sulfite which, if too dilute, may be evaporated down until a saturated solution, which is a commercial article, results.

If it is desired to convert this sodium acid sulfite into the normal sodium sulfite, milk of lime, as previously stated, is added to the solution, whereupon calcium sulfite is precipitated out, leaving the desired sodium sulfite in the solution, in accordance with the reaction indicated by the following formula, viz:—

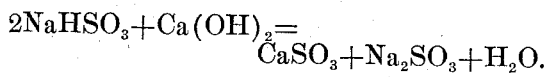

The calcium sulfite precipitate, upon being separated so as to leave the clear solution, may then be used, as described above, with more niter cake, to make more sodium bisulfite solution, and to this extent the process becomes a cyclical one. By well known methods of treatment the sodium sulfite solution may be increased in density, or the crystalline product obtained therefrom, as desired.

The term "sulfite" as used herein, is to be understood as referring to either the normal or acid sulfite, (*i. e.*, bisulfite) unless otherwise specifically indicated.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a method of making sodium sulfite, the steps which consist in reacting between calcium sulfite and niter cake, whereby acid sodium sulfite and calcium sulfate are formed; and then reacting between such acid sulfite and milk of lime, substantially as described.

2. In a method of making sodium sulfite, the steps which consist in reacting between calcium sulfite and niter cake, whereby acid sodium sulfite and calcium sulfate are formed; reacting between such acid sulfite and milk of lime, whereby normal sodium sulfite and calcium sulfite are formed; and then reacting between such calcium sulfite and more niter cake, substantially as described.

3. In a method of making sodium sulfite, the steps which consist in adding a solution of niter cake to a mixture of calcium sulfite and water, whereby acid sodium sulfite is formed, together with a precipitate of calcium sulfate; separating out the latter; and then adding milk of lime to the residual solution, whereby normal sodium sulfite is formed.

4. In a method of making sodium sulfite, the steps which consist in adding a solution of niter cake to a mixture of calcium sulfite and water, whereby acid sodium sulfite is formed, together with a precipitate of calcium sulfate; separating out the latter; adding milk of lime to the residual solution, whereby normal sodium sulfite is formed, together with a precipitate of calcium sulfite; and then separating out the latter and reacting between the same and more niter cake as before.

Signed by me, this 20th day of June, 1918.

EDWIN O. BARSTOW.